Jan. 21, 1969  H. CHAPLAIS ETAL  3,423,152
MOTION PICTURE PROJECTOR WITH OPPOSITELY
POSITIONED LIGHT SOURCES
Filed Sept. 17, 1965  Sheet 1 of 14

FIG. 1

HENRI CHAPLAIS
LUCIEN PILLON
GEORGES P. CARRE'
LUCIEN RIPS
RENE' GAMBETTE

INVENTORS.

BY
Alonzo S. Blodgett

FIG. 2

HENRI CHAPLAIS
LUCIEN PILLON
GEORGES P. CARRE'
LUCIEN RIPS
RENE' GAMBETTE
INVENTORS

3,423,152
MOTION PICTURE PROJECTOR WITH OPPOSITELY POSITIONED LIGHT SOURCES
Henri Chaplais and Lucien Pillon, Paris, Georges P. Carre, Chatillon-sous-Bagneux, and Lucien Rips and Rene Gambette, Paris, France, assignors to Societe Anonyme France-Ecrans, Paris, France, a corporation of France
Filed Sept. 17, 1965, Ser. No. 488,105
Claims priority, application France, Oct. 9, 1964, 990,879; Apr. 1, 1965, 11,629
U.S. Cl. 352—115   5 Claims
Int. Cl. G03b 41/04

ABSTRACT OF THE DISCLOSURE

A motion picture projector having a rotating crown of lenses and two projection lamps positioned on opposite sides of the crown of lenses. The projection lamps face each other with their beams directed along an axis perpendicular to and passing through the axis of the crown of lenses. Separate film winding and guiding means cooperate with each of the projection lamps such that one film is rewound while the other is projected.

---

In the projection of motion pictures, it is the usual practice to stop each frame of the film in the path of light for projection for a short time and, then, to move the film until the next frame is located in the path of the light; a shutter mechanism assures that the picture is projected only while a frame is in a fixed position in the path of the light. While this method of projection is adequate for the projecting of long motion picture films, it does not serve the purpose where it is necessary to project a short length of film repeatedly as in an advertising display or the like. When short lengths of film are run over and over, the wear can be quite substantial, if discontinuous motion of the film is used. The ideal situation in such cases would be the use of continuous movement of the film. In the past, such continuous movement has required optical compensation that could only be obtained by the use of multiple lenses, prisms of a generally rhomboidal form, or oscillating mirrors; even so, the results have been less than satisfactory. Attempts to use a plurality of lenses mounted on an endless belt have failed because the focal length of the successive lenses must be exactly identical which requires careful machining of the lenses in the mounts and for an optical adjustment of each one. Those apparatus which have used prisms with multiple facets have introduced unacceptable chromatic aberrations in forming an image and their function is imperfect as the result of their prismatic structure. Oscillating mirrors have presented the difficulty of considerable noise and they also require the projection of a reduced image and the reproduction of this image by a second optical element which, in the absence of complex collecting lenses, considerably diminishes the brightness of the final image. In addition, some thought has been given to using endless loops of film whose ends have been spliced together and mounted on a single drum with inner movement and peripheral spooling. However, it is difficult with a system such as this to obtain regular motion because the coils are either too tight or too loose. Because the coils slide against one another (their length being variable and their linear speeds differing), this results in scratches as well as shocks and these considerably reduce the longevity of the film. These and other difficulties experienced with the prior art devices have been obviated in a novel manner by the present invention.

It is, therefore, an outstanding object of the invention to provide a projector bringing about the continuous projection of film with optical compensation by multiple lenses permitting the use of groups of lenses whose focal lengths are completely identical and may be optically adjusted individually.

Another object of this invention is the provision of a projector permitting the repeated running of short lengths of film without excessive wear on the film.

A further object of the present invention is the provision of a projector using continuous movement of the film with high image definition, no flicker, and no wear on the film.

It is another object of the instant invention to provide a projector using two strips of film of a standard type and of equal length whose projection is automatic and continuous, the two strips of film being operated in such a way that one winds while the other unwinds.

It is a further object of the invention to provide a projector for the repeated projection of film from short lengths of film which is simple in construction, which is inexpensive to manufacture, and which is capable of a long life of useful service with a minimum of maintenance or attention on the part of the user.

With these and other objects in view, as will be apparent to those skilled in the art, the invention resides in the combination of parts set forth in the specification and covered by the claims appended hereto.

The character of the invention, however, may be best understood by reference to some of its structural forms, as illustrated by the accompanying drawings in which.

Generally speaking, the present invention involves the use of two strips of film of standard type and of equal length. The projection is automatic and continuous, the two strips of film being moved so that one winds while the other is unwinding. The strips of film move horizontally through two channels of appropriate shape with a frame corresponding to a double-frame set in front of two projection lamps placed opposite one another. The films are projected alternately on a screen by means of a crown of multiple lenses common to both lamps and both channels and rotating between them. A mechanical means is provided to simultaneously turn sprocket wheels driving the film and this movement operates through an appropriate linkage to cause rotation of the crown, an anti-flicker device, and the film reels.

Figure 1:
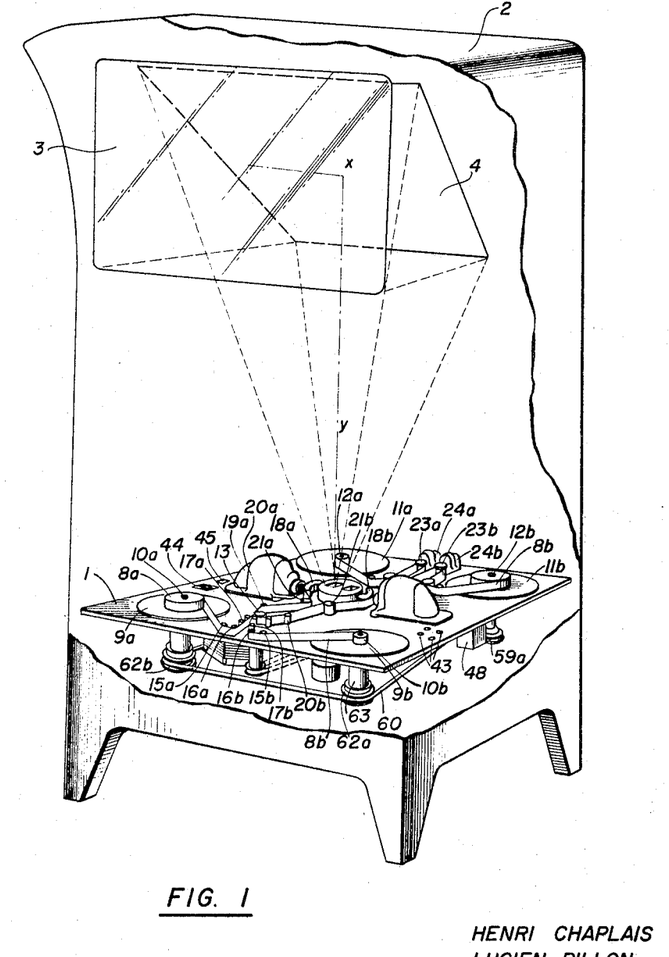
FIG. 1 is a perspective view of a projector embodying the principles of the present invention with portions removed for clarity of presentation.
Figure 2:
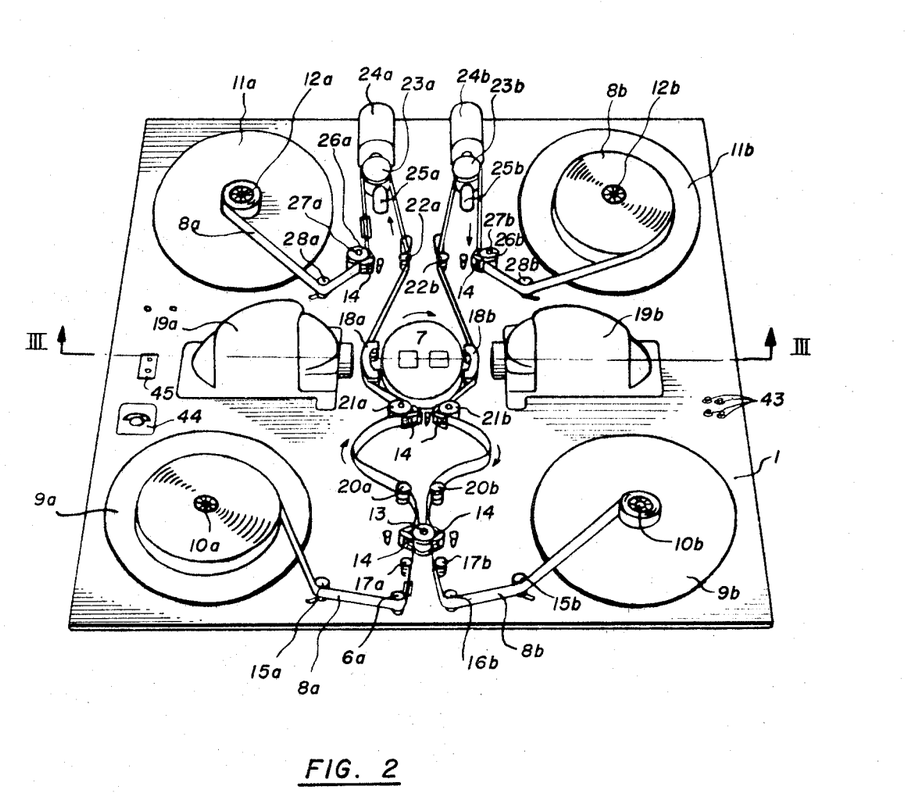
FIG. 2 is a perspective view of the operative elements of the projector.
Figure 3:
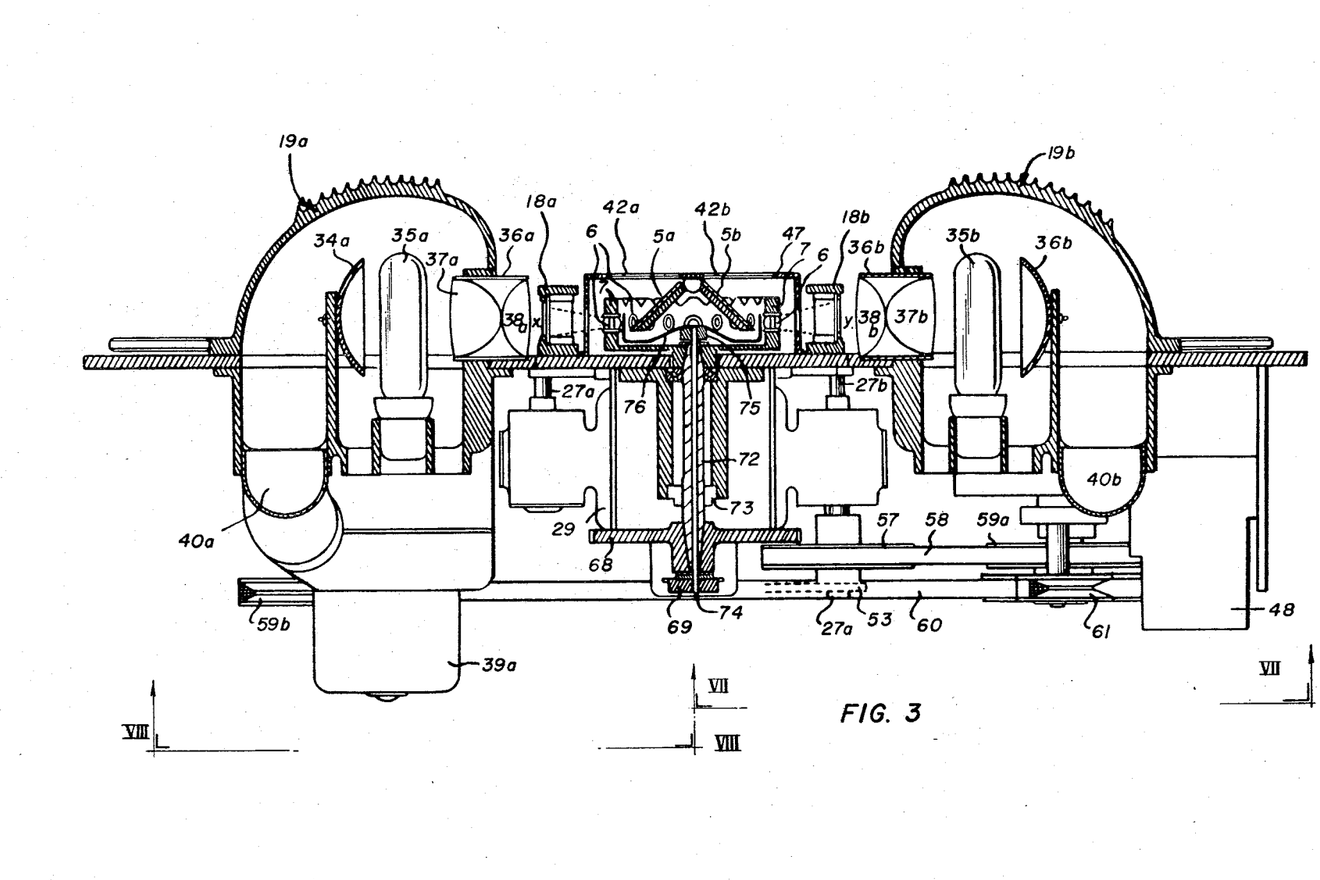
FIG. 3 is a vertical sectional view of the invention taken on the line III—III of FIG. 2.

Referring first to FIGS. 1, 2, and 3, it can be seen that the projector comprises a platen 1 mounted in the lower part of a cabinet 2 at the upper part of which is provided a screen 3 which receives (through a mirror 4) a beam of light coming from multiple lenses 6 mounted on a crown 7.

A strip of film 8a being projected unrolls from the flange 9a of a reel 10a to the flange 11a of a reel 12a, while a strip 8b passes from the flange 11b of a reel 12b to the flange 9b of a reel 10b. The directions of motion of these two strips is indicated by arrows, as is the direction of rotation of the crown 7. The reels 10a and 12a turn in the same direction, the film 8a is driven by a drive sprocket wheel on a pin 13 which is fitted with double clamps 14, the film passing over the rollers 15a, 16a, and 17a. The film then arrives at a curved projection channel 8a located in front of a lamp 19a after passing over a pressure roller 20a and a sprocket 21a with a clamp 14. The film then passes over another pressure roller 22a to reach a drum 23a associated with a sound pickup 24a having a photoelectric cell 25a. From there it passes over a drive sprocket wheel 26a having a clamp 14 and a pressure roller 28a from which it winds around the reel 12a.

Figure 12:
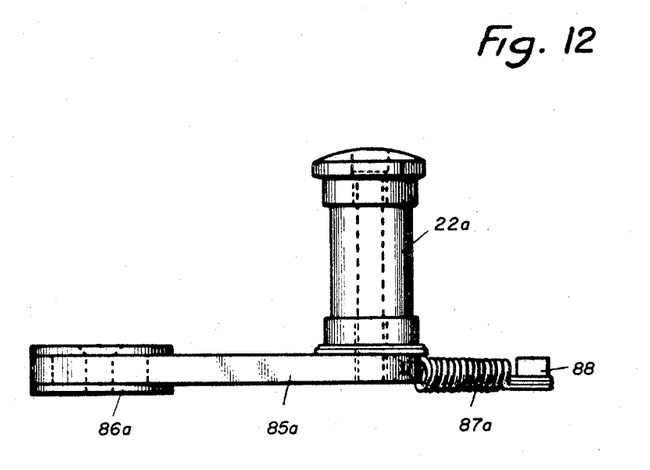
FIG. 12 is a front elevational view of a film tension-regulating apparatus.
Figure 13:
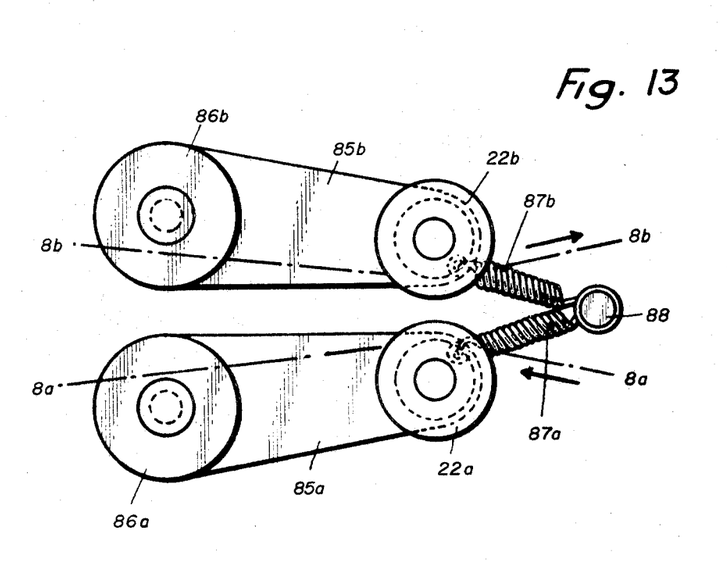
FIG. 13 is a plan view of the apparatus shown in FIG. 12.

Roller 22a and its counterpart 22b are attached to the ends of swinging arms 85a and 85b (see FIGS. 12 and 13) which are hinged to bases 86a and 86b fastened to the upper surface of the platen 1 and are connected, respectively, to springs 87a and 87b which are connected to a pin 88. This apparatus applies even tension to the two strips of film 8a and 8b and helps to hold them in the projection channels 18a and 18b and on the drums of the sound pickups 23a and 23b.

Figure 7:
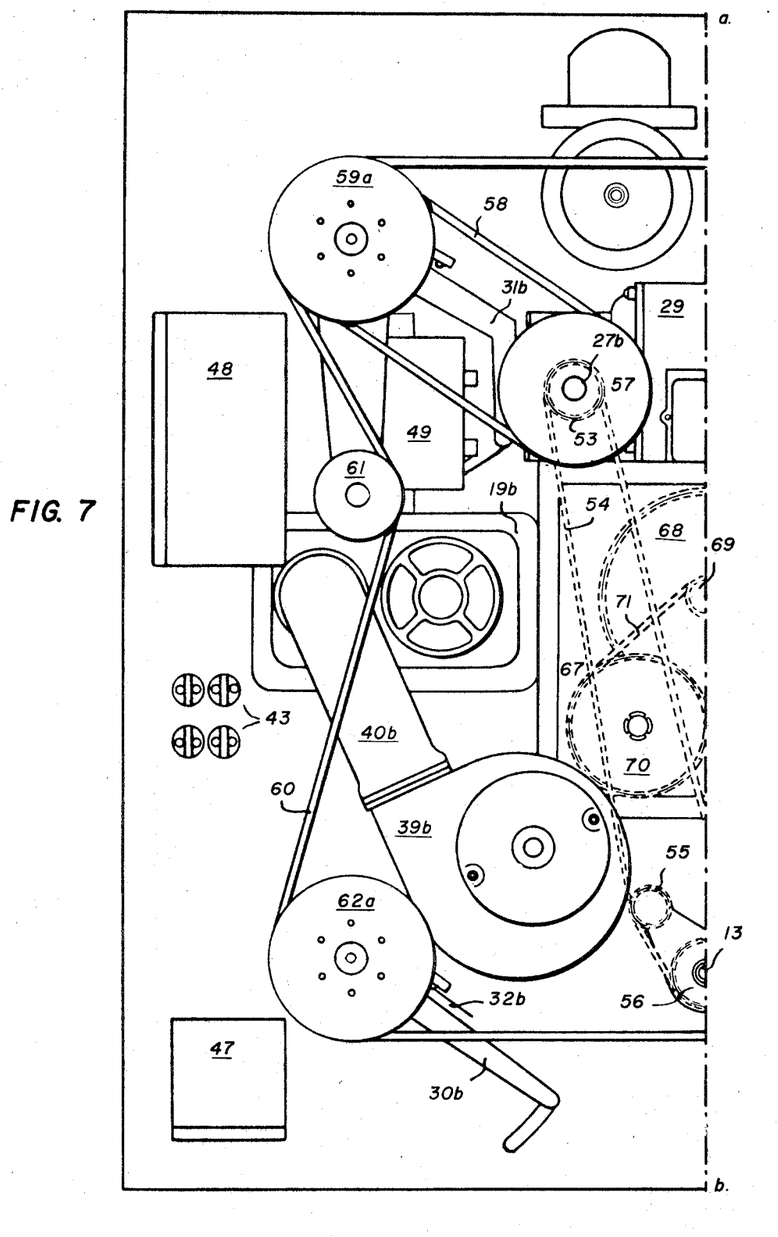
FIG. 7 is a bottom view of a half of the apparatus as viewed along the line VII—VII of FIG. 3.
Figure 8:
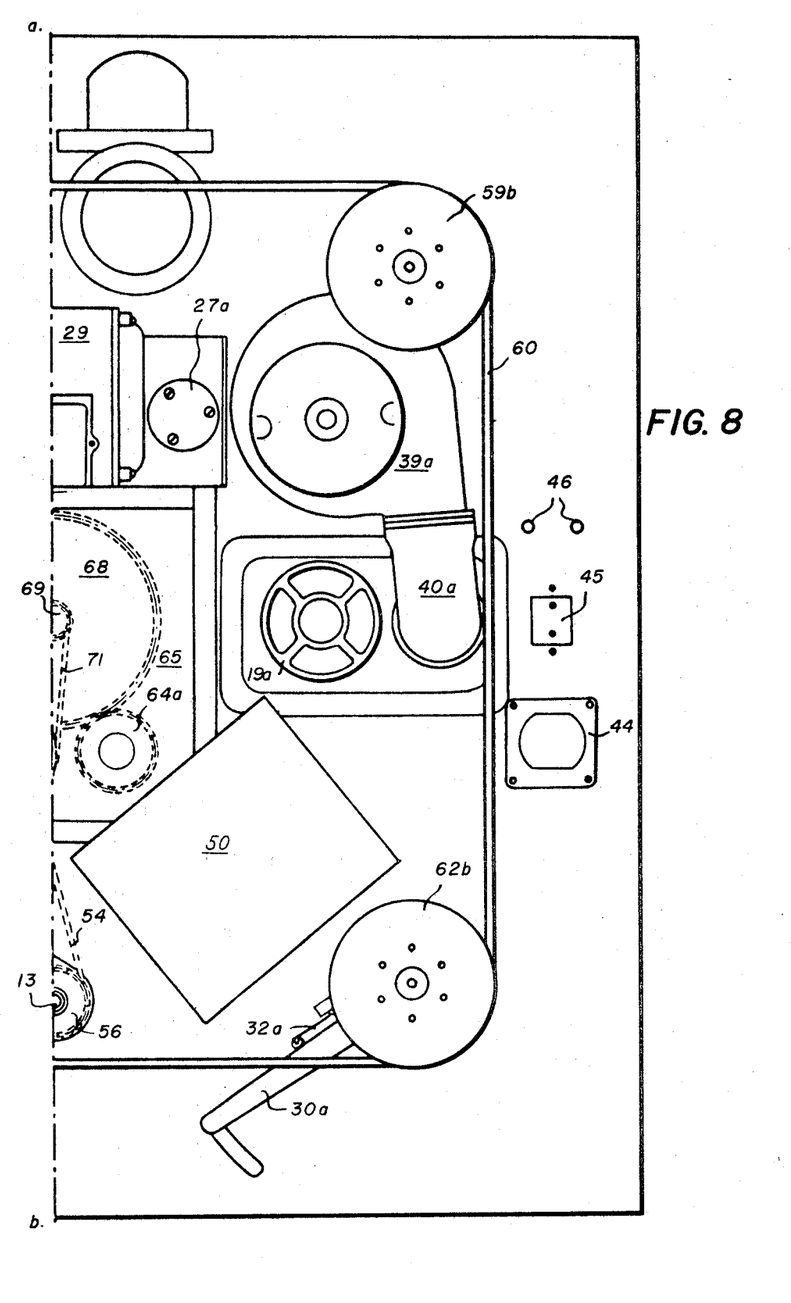
FIG. 8 is a bottom view of the other half of the apparatus as viewed along the line VIII—VIII of FIG. 3.

The sprockets 26a and 26b are fastened to shafts 27a and 27b, respectively, which extend from two reduction gears of a motor 29 (see FIGS. 7 and 8). The crown 7, bearing the multiple lenses 6 on an annular wall, is rotatably mounted and turns in the direction indicated by the arrow and, thus, follows the movement of the strip of film 8a during its passage through the curved projection channel 18a.

The strip of film 8b which has just been projected unwinds from the reel 11b toward the reel 9b. After passing over the roller 28b, it is driven by sprocket wheel 26b fastened to shaft 27b, passes over the drum 23b of the sound reader 24b (whose lamp is not lit) and, by passing over roller 22b (which, with its counterpart 22a, is part of the tension adjusting device described above), reaches to the curved channel 18b in front of projection lamp 19b (which lamp is cut from the circuit). Then, the film passes over the sprocket 21b, and over the roller 20b, to the drive sprocket 13. The film then passes over the pressure rollers 17b, 16b, and 15b, and this strip of film 8b reaches reel 9b and winds around core 10b.

Pressure rollers 15a, 15b, 28a, and 28b are attached to arms 30a, 31a, and 31b (see FIGS. 7 and 8) paired with four microswitches 32a, 32b, 33a, and 33b (31a and 33a are hidden by the blower 39a) which immediately stop the apparatus when one of the arms is freed by accidental tearing of one of the strips of film.

In FIG. 3 the projection lamps are shown as 19a and 19b, the curved projection channels as 18a and 18b, the crown of multiple lenses as 7 and a pair of flat orthogonal mirrors as 5a and 5b. The latter alternately receive the beam of light from the images on the two films 8a and 8b projected alternately in the curved channels 18a and 18b.

These mirrors 5a and 5b ensure convergence of the images from the two films onto the projection screen 3 after being reflected by the large mirror 4 inclined at 45° to the vertical plane containing the optical axis x–y.

The projection lamps 19a and 19b consist of mirrors 34a and 34b, lamps 35a and 35b, and condensers 36a and 36b, respectively. Each condenser is composed of two lenses, one aspherical 37a (37b) and the other spherical 38a (38b). The loops are continuously ventilated by two blowers 39a and 39b, one for each lamp whose fluid intake pipes are shown as 40a and 50b (FIGS. 3, 7, and 8). The crown 7 and the mirrors 5a and 5b are housed in a case 41 fitted with two projection windows 42a and 42b.

Referring to FIG. 2, the platen 1 is provided with a switch 43 for manual control of the apparatus by pushbuttons. An all voltage switch 44 is also provided, as well as a plug 45 to power a stabilized high fidelity amplifier.

Under platen 1 (FIGS. 7 and 8) are located the wiring 46, the sound pickups 24a and 24b, a switch 47, an inverter 48, a condenser 49, and an auto-transformer 50. One of the strips of film 8a or 8b is provided with a beginning and an end leader having notches formed on the edges of their perforations. These notches alternately activate a microinverter which trips a relay and, in turn, cuts off the current coming from the motor to the projection and excitation lamps. By another contact, the relay energizes a second timed relay for preheating and a direction inverter 48 which reestablishes the circuits for the motor, the projection, and the excitation lamps associated with the particular film to be projected.

The projection lamp which is to go into operation is thus preheated for a required time, say, 2 to 3 seconds when the motion of the film is reversed after the projection of film 8a. Film 8b is then projected in its turn, travelling from reel 9b to reel 11b, while the crown 7 with its lenses 6 turns in a direction opposite to the arrow.

The two strips of film always travel in the same direction during their alternative projection, that is to say, from reel 9b to reel 11b for film 8b and from reel 9a to reel 11a for film 8a, the discharge reels being adjacent.

An alternative construction would allow the two strips of film to travel in the opposite direction for alternative projection, for instance from reel 11a to reel 9a for film 8a and from reel 9b to reel 11b for film 8b by modifying the postion of the sound reader 24a and the drive mechanisms of the two strips of film which, of course, would still be the same length. The crown 7 with its lenses would always turn in the same direction.

The drive mechanisms of the device are housed beneath the platen 1 and are shown in FIG. 7. From the two reduction gears of motor 29 emerge shafts 27a and 27b which extend through the platen 6 and on these shafts are fastened sprockets 26a and 26b which drive the strips of film. The shaft 27b also carries a sprocket 53 which, by means of a chain 54 with an idler 55, drives another sprocket 56 which turns the shaft 13 on which is mounted the common sprocket used to drive film 8a and 8b together. On this same shaft 27b is fastened a pulley 57 which, by means of a belt 58, turns a pulley 59a. This pulley, in turn, drives a belt 60 with an idler 61 which brings about the rotation of the pulleys 59b, 62a and 62b, these pulleys being capable of free rotation. These pulleys are visible (except for pulley 59b in perspective in FIG. 1, the pulleys being connected to the reels 9a, 9b, and 11a by means such as the pulleys 63 in the case of the reel 9b.

Figure 9:
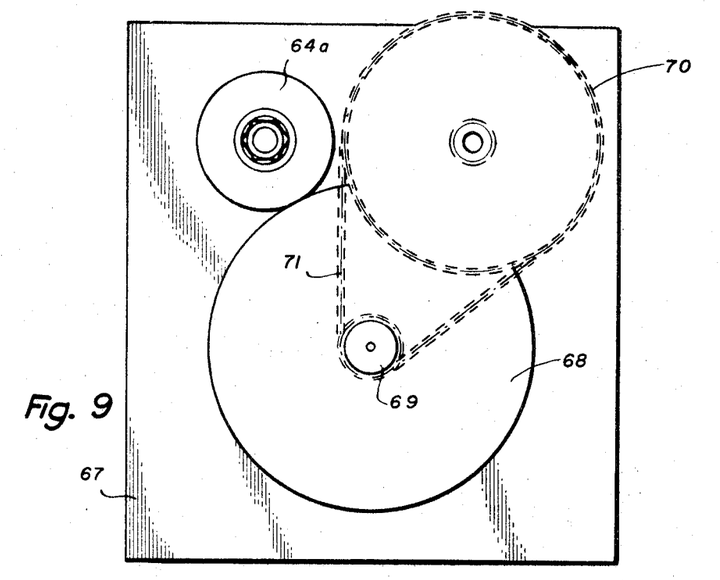
FIG. 9 is a plan view of a portion of the drive apparatus.
Figure 10:
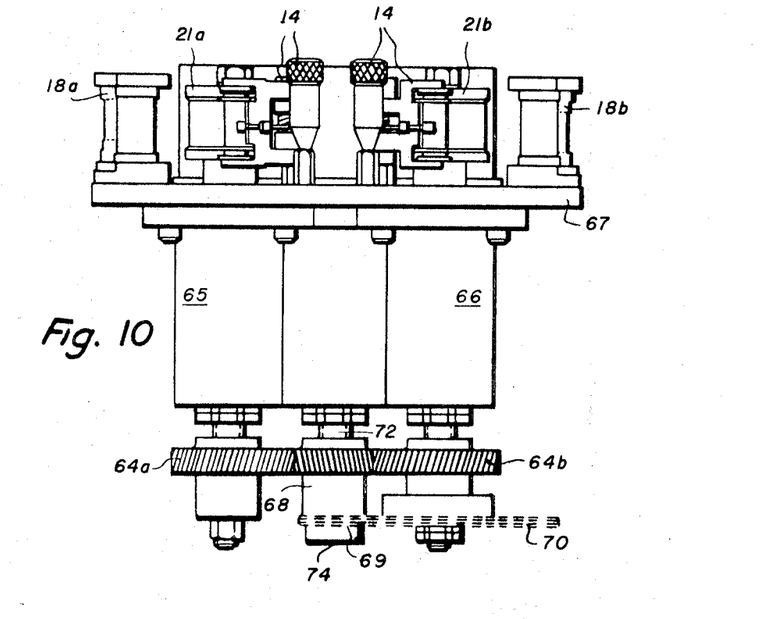
FIG. 10 is a front elevational view of the apparatus shown in FIG. 9.
Figure 11:
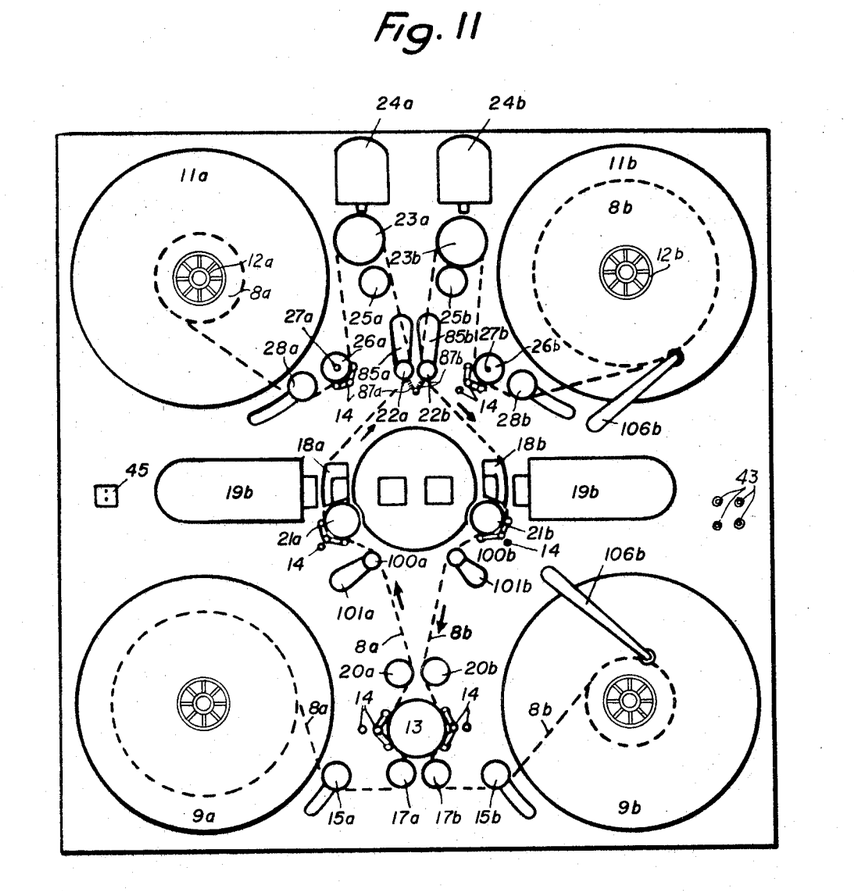
FIG. 11 is a plan view of the apparatus shown in FIG. 2.

As they pass over them, the films 8a and 8b drive the sprocket wheels 21a and 21b. As is evident in FIGS. 9 and 10, their rotation causes satellite pinion gears 64a and 64b to turn through sleeves 65 and 66 (which are mounted on another platen 67) and mesh with a pinion gear 68 attached to a hollow shaft 72 in which is rotatably mounted as shaft 74 associated with a sprocket gear 69 driven by a pinion 70 through the medium of a belt 71.

Figure 4:
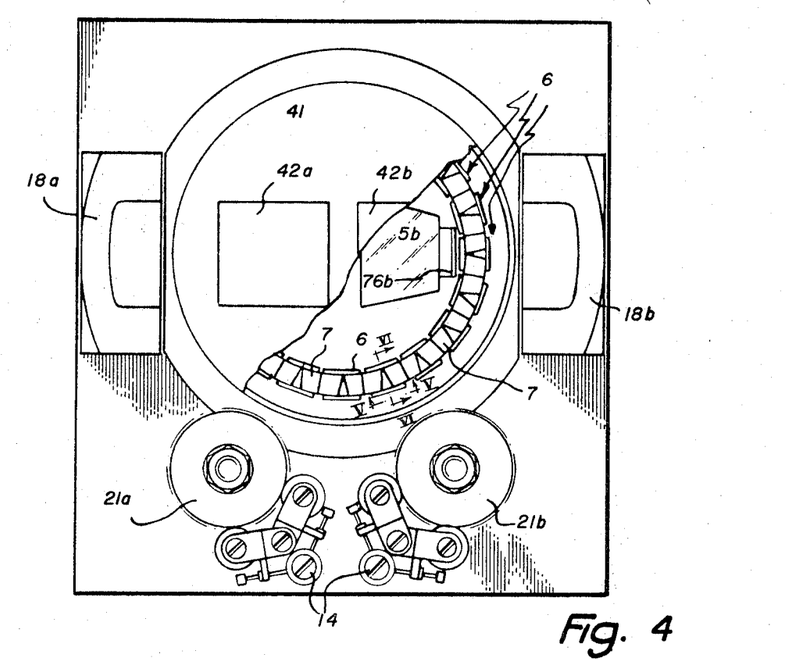
FIG. 4 is a plan view of a lens system forming part of the invention with portions broken away.

Referring to FIG. 3, the hollow shaft 72 associated with the pinion gear 68 is mounted on roller bearing 73 and carries the crown 7. The shaft 74 extends through the hollow-shaft 72 from one end to the other and at its upper end carries a head 75 on which is mounted an anti-flicker device 76 consisting of a cup with vertical blades, one blade 76b being visible in FIG. 4. This anti-flicker device turns inside the crown 7 at a greater speed than the latter (about ten times as great) and in the opposite direction.

In a practical embodiment of the invention, the two strips of film 8a and 8b had the same length of 400 meters and were projected at 24 frames per second or 52 frames per meter. The duration of the program was about 30 minutes and this program was automatically repeated as often as desired.

Figure 5:
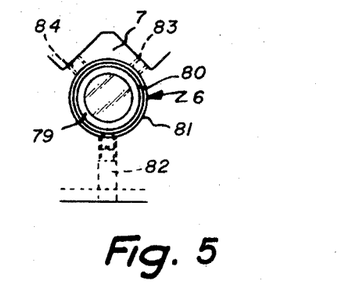
FIG. 5 is a view of an individual lens as viewed from the line V—V of FIG. 4.
Figure 6:
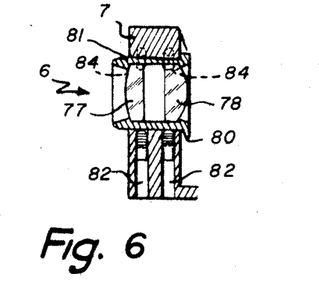
FIG. 6 is a vertical sectional view of a lens taken on the line VI—VI of FIG. 4.

Referring to FIGS. 5 and 6, each lens 6 consists of two achromatic doublets 77 and 78 mounted in a barrel 79 which, in turn, is held in a mount 80 which is inserted in conical bore 81 formed in the vertical annular wall of the crown 7. The optical axis of each lens may be modified by the combined action of two spaced groups of three set screws 82, 83, and 84 on one hand and 82', 83', and 84' on the other hand. FIG. 5 shows the 120° spacing of the three set screws 82, 83, and 84 in a vertical plane.

During projection, the film is driven continuously and each frame is followed by a lens 6 during its motion across one of the double frames in the channels 18a and 18b. As only one light source is provided for projection at a given frame, there is a variation in lighting which reaches its maximum when the frame on the film is on the optical axis of the channel. This results in a certain amount of flicker which is eliminated by the rotating blades of the cup 76 as they pass between the lens 6 and the respective mirrors 5a or 5b.

Figure 20:
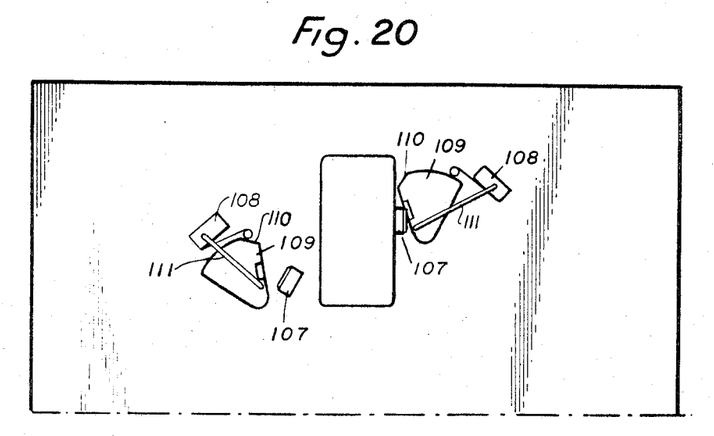
FIG. 20 is a plan view of certain reversing mechanism.
Figure 21:
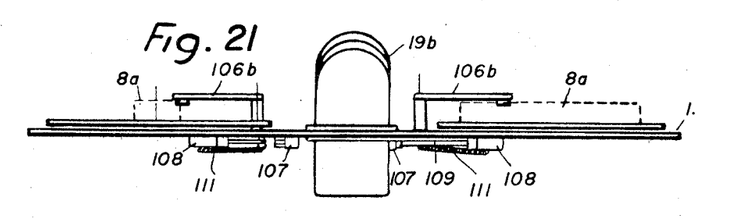
FIG. 21 is a front elevational view of the reversing mechanism.
Figure 22:
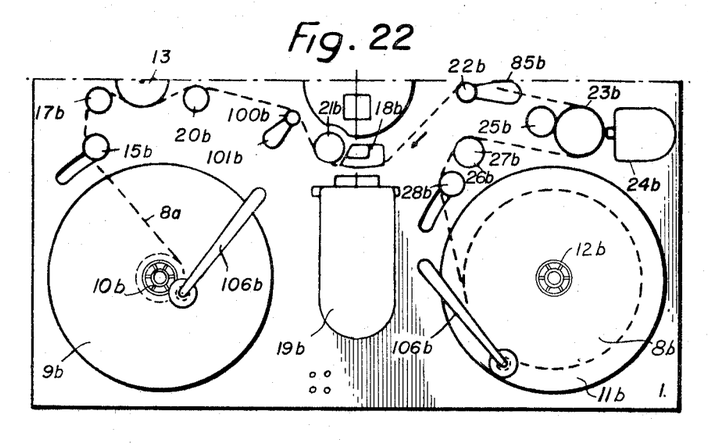
FIG. 22 is a plan view of a film driving apparatus embodying the reversing mechanism.

When the films 8a and 8b are in poor condition, the notches at the edges of the perforations at the beginning and end of the strip are liable to cause defects in the automatic reversal of direction of the two strips after one has been projected. It is advantageous to replace the notch system by the device represented in FIGS. 20, 21, and 22 which are, respectively, top, edge, and bottom views of the platen 1 showing a mechanism for the control of film reversal. This mechanism uses feeler arms 106b and 106b' with return springs 111, 111' and stops 107, 107' attached to the lower surface of the platen 1. The feeler arms 106b and 106b' are connected to cams 109, 109' by means of vertical shafts passing through the platen 1. At the end of a projection cycle, shown by the position of feeler arm 106b in relation to the reel 9b in FIG. 22, the contact finger of a microswitch 108 (108') comes down on incline 110 (110') of cam 109 (109') and opens the motor circuit. After reversal takes place, the projection speed of the two films 8a and 8b increased from 0 to 24 frames per second. Until this projection speed has been reached, premature heating by one of the projection lamps may take place, causing deterioration as well as image distortion. These two disadvantages are eliminated by a centrifugal device which causes a delay in lighting the projection and excitation lamps.

Figure 14:
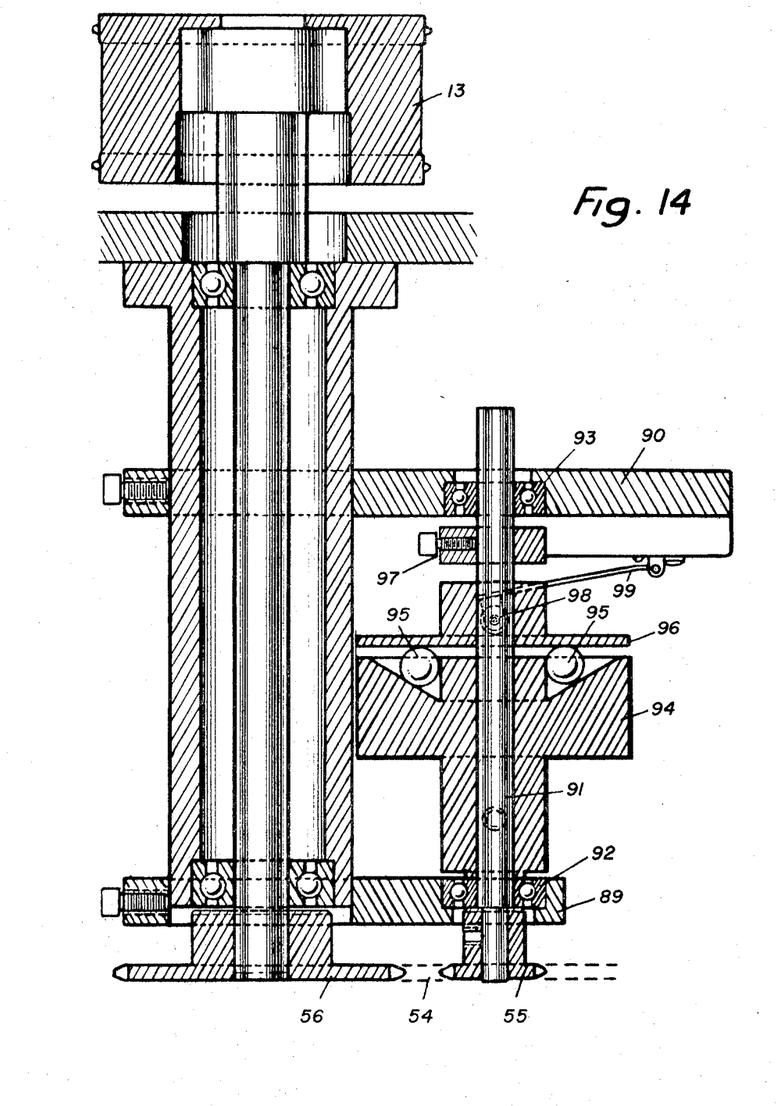
FIG. 14 is a vertical sectional view of a centrifugal switch apparatus.

This centrifugal device, which is shown in cross-section in FIG. 14, is attached by arms 89 and 90 to the spindle of the chain sprocket 56. A pin 91, held by ball bearings 92 and 93 is driven by a sprocket 55 which itself is driven by the sprocket 56 through the chain 54. A cup 94, containing 11 steel balls like 95, and attached to the pin 91, is topped by a flange 96 which slides freely along the pin until it reaches a stop 97. A roller 98 on the contact finger of a microswitch rests on the upper surface of this flange 96. This microswitch operates through a relay to open and close the power circuits for the excitation lamps 24a and 24b and the projection lamps 19a and 19b. At rest, the balls 95 lie at the bottom of cup 94 and flange 96 rests on them. As the cup 94 (which can turn in both directions) rotates, the balls 95 leave their original central position under centrifugal force and press the flange 96 upwardly. When the projection speed of, say, 24 frames per second is reached, further rise of the flange 96 is prevented by the stop 97 and the circuit of microswitch 99 is closed by roller 98. The effect of this is immediately to cause excitation of the relay to re-establish the power circuits of the lamps of the sound pickup and projector.

Figure 15:
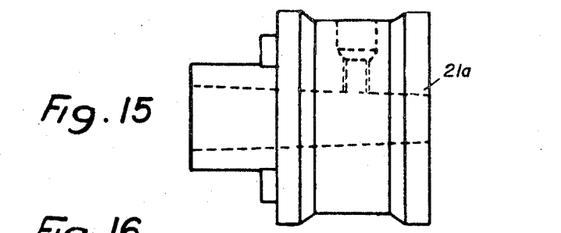
FIG. 15 is a plan view of a sprocket wheel.
Figure 15A:
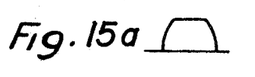
FIGS. 15a and 15b are enlarged views of teeth used on the sprocket wheel.
Figure 15B:
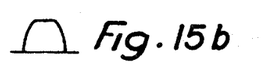
Figure 16:
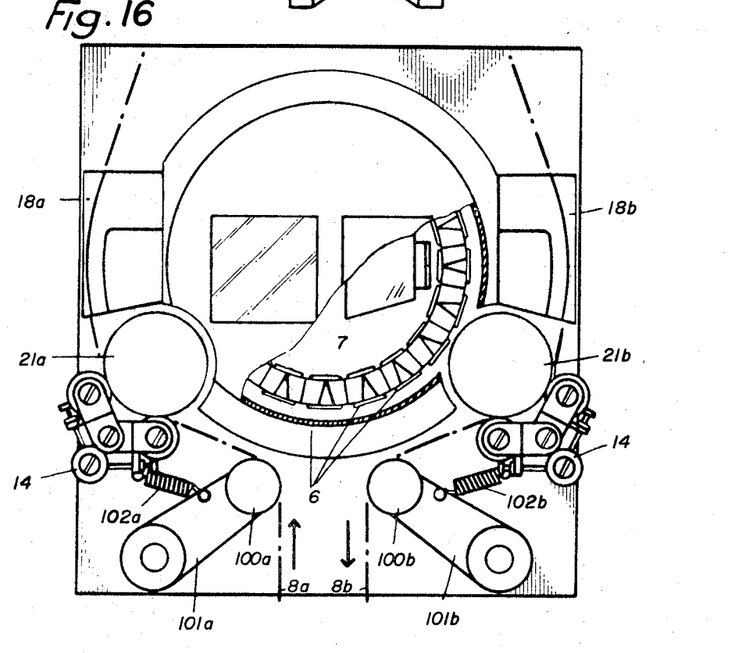
FIG. 16 is an alternative construction of a lens system.
Figure 17:
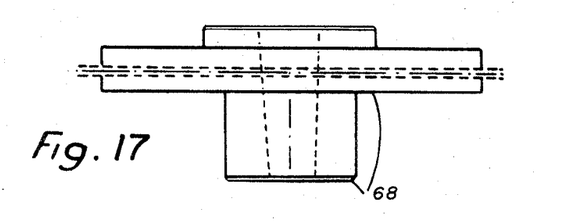
FIG. 17 shows a front elevational view of a certain drive apparatus.
Figure 18:
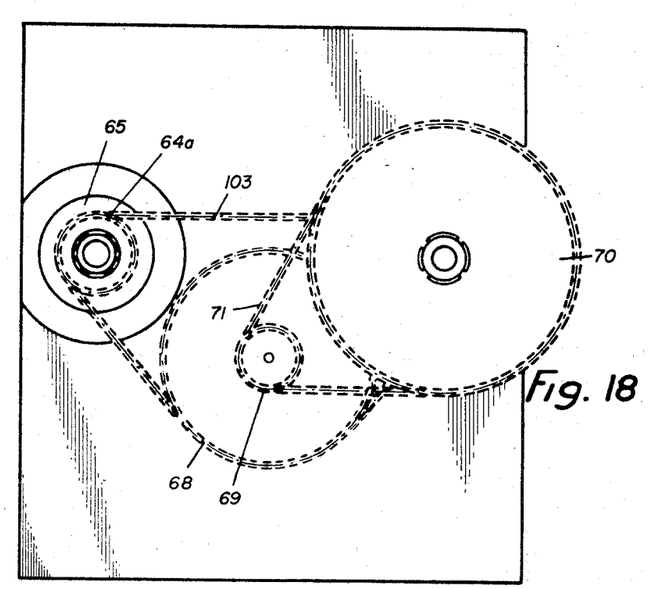
FIG. 18 is a plan view of a drive apparatus.
Figure 19:
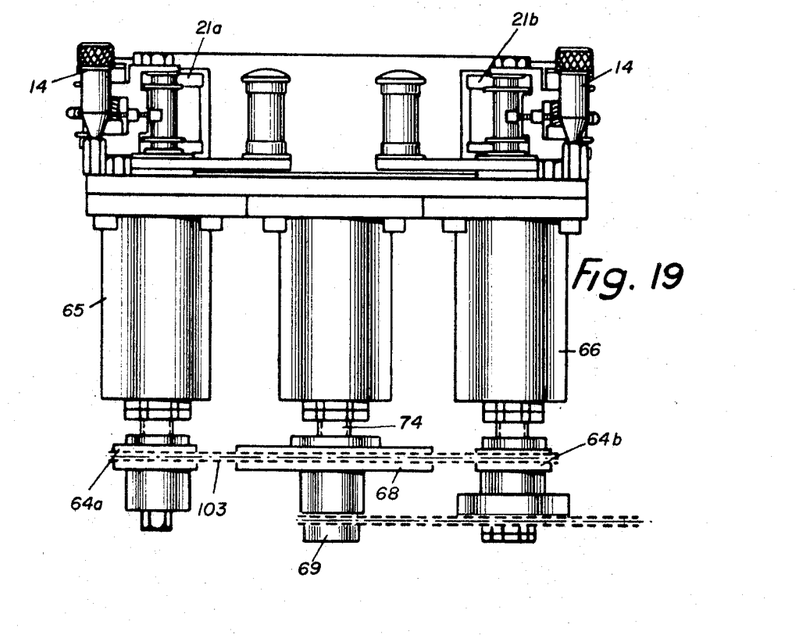
FIG. 19 is a front elevational view of the drive apparatus shown in FIG. 18.

FIGS. 15 to 19 show a drive system used specially for the crown 7 and its lenses and they show sprockets which prevent slippage of films 8a and 8b as they enter the channels 18a and 18b. On the lower part of sprockets 21a and 21b, as shown in FIG. 15, larger teeth are used (FIG. 15a) than the standard teeth (FIG. 15b) on the upper part. These sprockets, as well as the crown 7, are attached to chain sprockets 64a, 64b and 68' which are driven by chain 103. The strip of film 8a or 8b coming from pressure roller 20a or 20b passes over the roller 100a or 100b (see FIGS. 3 and 16) carried by a swinging arm 101a or 101b having a return spring 102a or 102b. The film then reaches the sprocket 21a and 21b with special lower teeth and enters the curved channel 18a or 18b.

Figure 23:
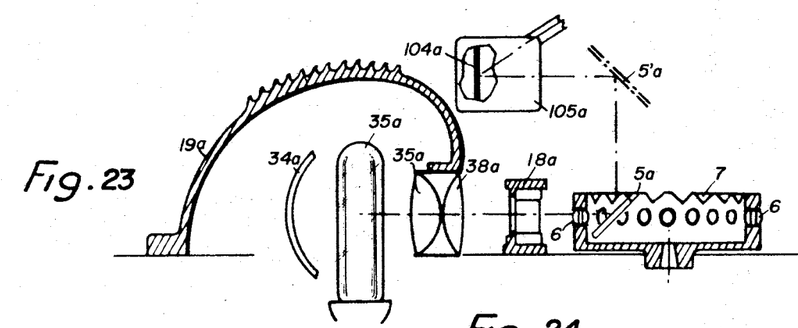
FIG. 23 is a vertical sectional view of an alternative version of the apparatus intended for use in television.
Figure 23A:
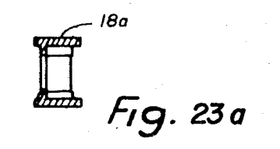
FIGS. 23a and 23b show details of an aperture forming part of the apparatus of FIG. 23.
Figure 23B:
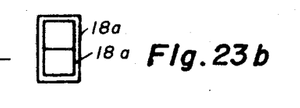

Continuous motion behind an aperature corresponding in size to a double frame of a film (which has been photographed discontinuously at, say, 24 frames per second) with optical compensation by the crown with multiple lenses provides an elegant solution for deferred transmission of television films, because it requires neither additional optical elements nor a shutter, nor prisms, nor oscillating mirror, nor mirror wheel. By judiciously combining the focal lengths of the condenser of the projection lamp and the lens 6, it is possible, as shown in FIG. 23 using an aperture corresponding to a double frame 18a, 18a', to obtain on the photocathode 104a of a television tube 105a a continuous image, preferably enlarged, in black and white or color, which may be used for whatever frequency is used for scanning. In France this would be 25 frames per second, and in the U.S.A. 30 frames per second.

Figures 24, 24A, 24B:
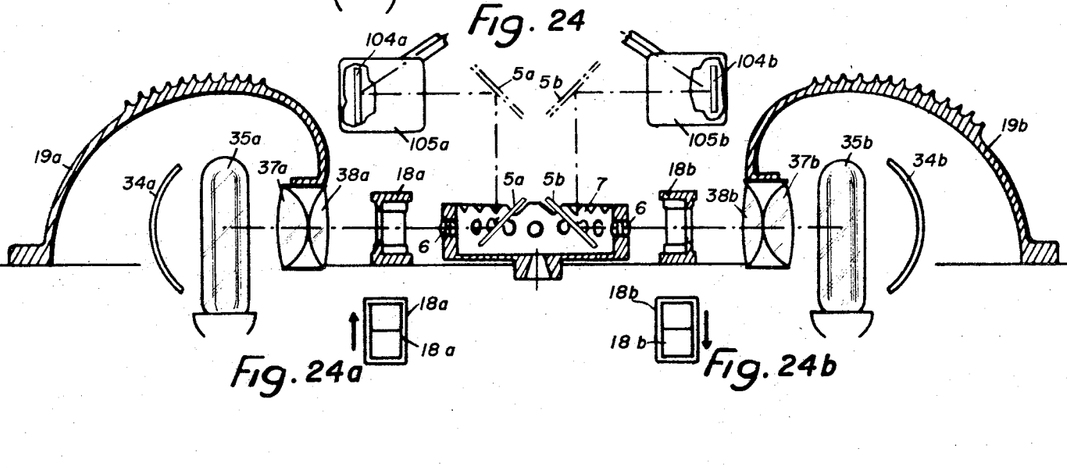
FIG. 24 is a vertical sectional view of an alternative form of the apparatus intended for use with television.
FIGS. 24a and 24b are views showing film movement in the apparatus of FIG. 24.

In addition, the crown 7, always turning in the same direction, is the perfect instrument for simultaneously telephotographing two strips of film, black and white or color of any length, the electromechanical units described above being modified to ensure independent synchronized and opposite movement of the two strips of film. FIG. 24 shows an arrangement of television tubes 105a and 105b with photocathodes 104a and 104b and of mirrors 5a and 5b to which are added correcting mirrors 5a' and 5b' while FIGS. 24a and 24b show the apertures 18a and 18a' as well as 18b and 18b', of the projection channels 18a and 18b in a horizontal plane with arrows showing the direction of the motion of the two strips of film.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A projector, comprising
   (a) means for guiding two separate films in continuous motion so that at one location they pass in separate spaced planes,
   (b) light means providing a light path through each of the films at the said location at a right angle to the plane of the film, and
   (c) a crown including an annular wall mounted for rotation about its major axis, the axis being located parallel to and spaced from the said planes and located in the said light paths, the annular wall being provided with a plurality of mounting devices each device carrying an optical lens, and
   (d) means is provided for guiding the two separate films on the opposite exterior sides of the annular wall of the crown.

2. A projector as recited in claim 1, wherein the two films are located at diametrically opposite sides of the crown and drive the crown at the same peripheral speed as themselves.

3. A projector as recited in claim 1, wherein the direction of film motion and of crown rotation are reversible.

4. A projector as recited in claim 1, wherein the two recited means and the crown are mounted in a cabinet having a screen on which the light path is projected.

5. A projector as recited in claim 1, wherein an antiflicker device is provided consisting of two blades turning inside the crown at a greater speed than the latter and in the opposite direction.

References Cited
UNITED STATES PATENTS

| | | | |
|---|---|---|---|
| 1,991,957 | 2/1935 | Ranieri | 352—117 |
| 2,582,013 | 1/1952 | De France | 352—133 |
| 2,609,724 | 9/1952 | Isom | 352—210 |
| 2,972,280 | 2/1961 | Kudar | 352—116 |
| 3,053,141 | 9/1962 | Boucher | 352—116 |

NORTON ANSHER, *Primary Examiner.*

M. H. HAYES, *Assistant Examiner.*

U.S. Cl. X.R.

352—125, 133